Nov. 4, 1958

C. A. GEMMA 2,858,844

LUBRICATED GATE VALVE

Filed Sept. 26, 1956

INVENTOR.
Charles A. Gemma.
BY
William J. Ruano
HIS ATTORNEY.

United States Patent Office 2,858,844
Patented Nov. 4, 1958

2,858,844

LUBRICATED GATE VALVE

Charles A. Gemma, Pittsburgh, Pa.

Application September 26, 1956, Serial No. 612,237

7 Claims. (Cl. 137—246)

This invention relates to a valve, and, more particularly, to a manually operated valve having a slidable plug for turning the valve on and off.

A very commonly used type of valve for numerous applications is the plug type valve including a rotary plug provided with a transverse opening which is turned into and out of registry with the inlet and outlet openings. Such plug type valve has numerous disadvantages. For example, a plurality of adjustments must be made and maintained to insure proper operation. If the gland is made too tight, the plug will not turn, and if too loose, leakage will occur through the gland. It must be lubricated by hand at frequent intervals since the lubricant tends to leak as the valve is operated. Certain valve parts often have no lubrication, therefore frictional rubbing together of metal parts will eventually cause damage to the plug or body. The valve is subject to freezing or scorching and includes numerous parts, that is about 28 parts, furthermore operation to the on and off position requires a wrench. Moreover, the valve requires frequent servicing.

An object of my invention is to provide a novel valve which is devoid of the above named disadvantages.

A more specific object of my invention is to provide a valve which is self-adjusting, self-lubricating, self-sealing and leak-proof and wherein there is no rubbing of metal parts with pressure, nor freezing or scorching since the parts always remain lubricated.

A further object of my invention is to provide a valve construction which includes less than half the number of parts of a plug type valve and which parts are relatively simple in construction, therefore making the cost of the valve considerably less than that of a plug type valve, as well as the cost of maintenance thereof.

A still further object of my invention is to provide a valve of compact construction, which is easy to disassemble, and service or lubricate, and which is extremely easy to turn on and off manually without the necessity of a wrench or power amplifying gears.

Other objects and advantages of my invention will become more apparent from a study of the following description taken with the accompanying drawing wherein.

Figure 1:
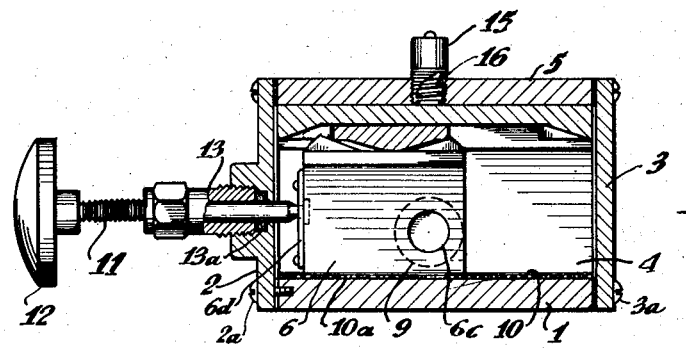
Figure 1 is a vertical, longitudinal sectional view of a valve embodying the present invention, the valve being shown in the open position.

Referring more particularly to the drawing, numeral 1 denotes a valve body having end covers 2 and 3 which are rigidly secured to the end surfaces of body 1, of downwardly and inwardly tapered sidewalls 4 and of top plate 5 by any suitable fastening means, such as bolts 2a and 3a. All the above described parts may be made of any suitable metal, metal alloy, plastic material such as transparent Lucite, or the like.

Figure 3:
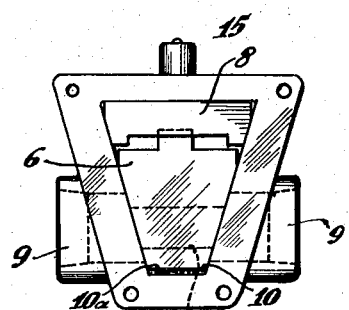
Figure 3 is an end view of the valve, as viewed from the right hand side of Figures 1 and 2, with the cover removed.

Slidably mounted within the valve housing is a plug 6 of any suitable material, which is wedge shape in cross section so as to closely fit the correspondingly shaped side walls 4 as will be more apparent in Fig. 3. In Fig. 1, a transverse bore 6c in plug 6 is shown in registry with valve inlet and outlet openings 9, whereby the valve is in the open position.

Figure 4:
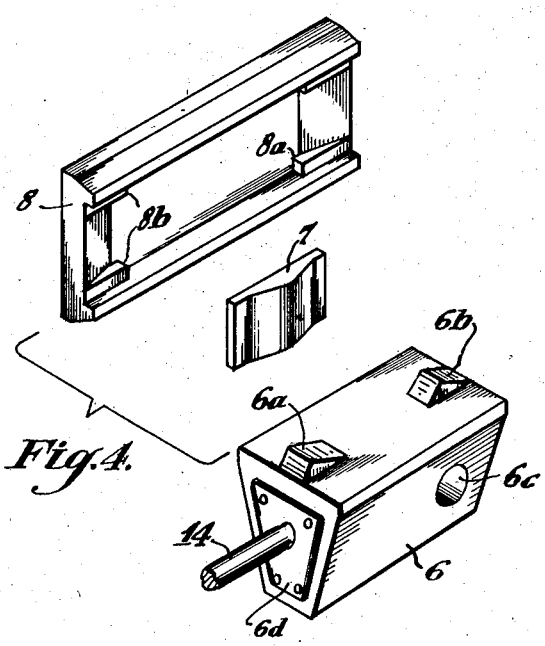
Figure 4 is an exploded, perspective view of the plug, wedge block and track of Figures 1 and 2 wherein the wedge block and track are rotated 90° to illustrate the bottom surface of these two parts.

On the top of plug 6 there are upstanding integral wedge-shaped portions 6a and 6b shown more clearly in Fig. 4, which are adapted to effect a wedging action with a wedge block 7 after such block is moved against either limit stop element 8a or 8b integrally formed underneath track 8.

Plug 6 may be slid in either direction by turning a spindle 11 which is screw threaded to a gland 13, which gland retains packing 13a. The inner end of spindle portion 14 is rigidly secured to the left end of plug 6 by any suitable means, such as by screw threading a nut onto a threaded end portion of the spindle on the inside of a plate 6d, which plate is screwed onto the left end of plug 6.

Plug 6 is slidable on a thin plate 10 of copper or other suitable material, which plate rests on a strip of compressible material 10a, such as packing material or rubber.

Lubrication plug 15 is screwed into the top plate 5 and contains a helical spring 16 which normally yieldingly engages the top surface of track 8 so as to force wedge block 7 downwardly at all times. The valve housing is filled with any suitable lubricant.

In operation, when knob 12 is turned in one direction and plug 6 is slid thereby to the position shown in Fig. 1, bore 6c thereof will come into registry with the inlet and outlet 9 so as to permit fluid to flow through the valve. In this open position of the valve, the left end of wedge block 7 abuts stop element 8b and wedge portion 6b of the plug 6 engages the right hand wedge surface of block 7 so as to force the block downwardly, effecting compression of packing 10a as well as a very tight fit between the sidewalls of plug 6 and the sidewalls 4 to prevent leakage of lubricant therebetween.

Figure 2:
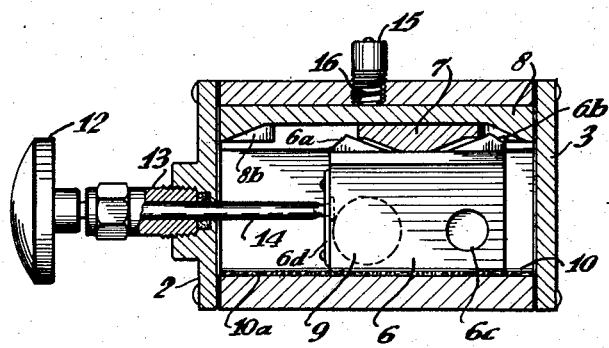
Figure 2 is a view similar to Figure 1 except showing the valve in the closed position.

When it is desired to close the valve, knob 12 is turned in the opposite direction so as to effect sliding of plug 6 to the right to the position shown in Fig. 2 wherein bore 6c moves out of alignment with the inlet and outlet openings 9 so as to close the valve and prevent passage of fluid therethrough. As the plug moves from the position shown in Fig. 1 to that shown in Fig. 2, wedge block 7 freely rides on top of plug 6 until finally block 7 will abut against stop element 8a whereby further movement of plug 6 will effect wedging of portion 6a with the corresponding left wedge portion of block 7 to again force plug 6 downwardly to compress packing 10a and provide a tight fit between the sidewalls of plug 6 and the housing sidewalls 4, whereby lubricant cannot escape between said sidewalls and through bore 6c as would otherwise occur.

It will be noted that after the valve housing is filled with a lubricant and sealed, the lubricant will last indefinitely and all valve parts within the housing will be constantly lubricated, therefore eliminating frictional rubbing between metal and metal and accompanying wear and scorching of parts such as the plug. As the plug 6 is slid, lubricant will move from one end thereof to the other by passing above plug 6, with a slight amount passing along the sides and bottom of the plug. Moreover the valve is self-lubricating, self-adjusting, self-sealing, and leak-proof and may be operated by very slight manual effort.

Thus it will be seen that I have provided an efficient, compact valve constructed of a minimum number of simple parts, making the valve very cheap to manufacture and assemble and very inexpensive to maintain in operating condition; furthermore, I have provided a slidable plug-type valve in which the lubricant will last indefinitely and will insure continuous lubrication of all interior parts, thereby eliminating wear, giving long life and facilitating operation of the valve, by requiring very little manual effort, and which valve, when turned to the on or off position, will not permit loss of lubricant; also I have provided a unique valve which requires practically no servicing or need for repeated lubrication.

While I have illustrated and described a single specific embodiment of my invention, it will be understood that this is by way of illustration only, and that various changes and modifications may be made within the contemplation of my invention and within the scope of the following claims.

I claim:

1. A valve comprising a housing having tapered longitudinally and oppositely disposed walls which converge downwardly and inwardly to form a tapered valve body of trapezoidal cross-section and which are provided with registering inlet and outlet openings, a plug therein having opposite walls correspondingly tapered and longitudinally slidable on said housing walls and having a bore adapted to register with said inlet and outlet openings when slid to the on position, means for sliding said plug in opposite directions longitudinally of said housing from the on to the off position, and wedging means for moving said plug in a radial direction so as to force said opposite plug walls into tight engagement with said housing walls as said plug is moved to one of said positions.

2. A valve as recited in claim 1 wherein said wedging means comprises an integral wedge portion formed on the top wall of said plug, and a wedge block mounted thereon for free sliding movement therewith, and stop means within the top portion of said housing and engageable by said wedge block as said plug is moved to the open position of the valve.

3. A valve having a housing including downwardly and inwardly tapered sidewalls having registering inlet and outlet openings, a plug having correspondingly shaped, downwardly and inwardly tapered sidewalls slidable on said housing sidewalls and having a transverse bore, a spindle screw threaded through one end wall of said housing and having an external, manually operable knob and an internal portion connected to one end wall of the plug so that as the knob is turned in opposite directions, the spindle will move in opposite directions and move said plug longitudinally of said housing from the on to the off position, and wedge means within the top portion of said housing for urging said plug downwardly into tighter engagement with said housing sidewalls as the plug bore is moved into registry with said inlet and outlet openings to turn the valve on.

4. A valve as recited in claim 3 wherein said wedge means comprises integral wedge portions formed on opposite, top end portions of said plug and a freely slidable wedge block having oppositely tapered lower surfaces selectively engageable with said wedge portions as the plug is moved either to the on or the off position adjacent the limits of movement of said plug.

5. A valve as recited in claim 3 together with a metal strip having a base strip of yieldable material, said housing including a bottom wall and said strips resting on the bottom wall of said housing so that as the plug is slid on said metal strip to the on or off position, downward movement of the plug will effect compression of said compressible strip.

6. A valve as recited in claim 4 wherein said wedge means includes a track member disposed above said plug and having downwardly extending projections at the end portions thereof engageable with the end walls of said plug as the plug is moved to the on or off position of the valve so as to arrest movement of said wedge block and permit selective wedging action between said lower surfaces of the block and said wedge portions of the plug and to force the plug downwardly into tight engagement with the housing sidewalls.

7. A valve as recited in claim 6 wherein said housing includes a top wall, together with a lubricant in said housing and a lubrication plug extending through said top wall of said housing including a spring which urges a track element downwardly at all times against said wedge block.

References Cited in the file of this patent

UNITED STATES PATENTS

| | | |
|---|---|---|
| 259,658 | Atcheson | June 20, 1882 |
| 1,126,395 | Clark | Jan. 26, 1915 |
| 2,209,994 | McGill | Aug. 6, 1940 |
| 2,592,953 | Roberts | Apr. 15, 1952 |
| 2,776,105 | Schmitz | Jan. 1, 1957 |